US009008149B2

(12) United States Patent
Huettinger et al.

(10) Patent No.: US 9,008,149 B2
(45) Date of Patent: Apr. 14, 2015

(54) SYNCHRONOUS ACCESS METHOD, AND COMMUNICATION DEVICE AND SYSTEM IN FREQUENCY HOPPING RADIO COMMUNICATION

(71) Applicants: Siemens Medical Instruments Pte. Ltd., Singapore (SG); Siemens Ltd., China, Beijing (CN)

(72) Inventors: Simon Huettinger, Erlangen (DE); Mattias Lampe, Beijing (CN); Jie Zhang, Beijing (CN)

(73) Assignees: Siemens Medical Instruments Pte. Ltd., Singapore (SG); Siemens Ltd., China, Beijing (CN)

( * ) Notice: Subject to any disclaimer, the term of this patent is extended or adjusted under 35 U.S.C. 154(b) by 0 days.

(21) Appl. No.: 14/068,370

(22) Filed: Oct. 31, 2013

(65) Prior Publication Data

US 2014/0119408 A1    May 1, 2014

(30) Foreign Application Priority Data

Oct. 31, 2012   (CN) .......................... 2012 1 0428899

(51) Int. Cl.
*H04B 1/7156*    (2011.01)

(52) U.S. Cl.
CPC .... *H04B 1/7156* (2013.01); *H04B 2001/71563* (2013.01)

(58) Field of Classification Search
USPC ................................................ 375/132–137
See application file for complete search history.

(56) References Cited

U.S. PATENT DOCUMENTS

| 2011/0032921 A1* | 2/2011 | Li et al. .......................... 370/342 |
| 2012/0014413 A1 | 1/2012 | Keshavarzian et al. |
| 2012/0026941 A1 | 2/2012 | Ahmad et al. |
| 2012/0310394 A1* | 12/2012 | El-Hoiydi ....................... 700/94 |

FOREIGN PATENT DOCUMENTS

| EP | 2151928 A1 | 2/2010 |
| JP | 2005033416 A | 2/2005 |
| WO | 2011106538 A1 | 9/2011 |

* cited by examiner

*Primary Examiner* — Kevin Kim
(74) *Attorney, Agent, or Firm* — Laurence A. Greenberg; Werner H. Stemer; Ralph E. Locher

(57) ABSTRACT

A method performs synchronous access between a first communication device and a second communication device. The first communication device adopts N frequency hopping channels and performs frequency hopping in a predetermined frequency hopping sequence and at a predetermined frequency hopping time interval. The first communication device sends a broadcast beacon over the N frequency hopping channels with a cycle of M times the predetermined frequency hopping time interval. The broadcast beacon carries general information including synchronization information. M and N are both natural numbers. The second communication device receives the broadcast beacon over any one frequency hopping channel of the N frequency hopping channels to acquire the synchronization information. The second communication device exchanges information with the first communication device for access. This flexible, simple and easy-to-implement synchronous access solution achieves high-efficiency utilization and good anti-interference of a bandwidth, and allows rapid and reliable synchronization with low power consumption.

12 Claims, 3 Drawing Sheets

SYNCHRONOUS ACCESS METHOD, AND COMMUNICATION DEVICE AND SYSTEM IN FREQUENCY HOPPING RADIO COMMUNICATION

CROSS-REFERENCE TO RELATED APPLICATION

This application claims the priority, under 35 U.S.C. §119, of Chinese application CN 2012 1042 8899.8, filed Oct. 31, 2012; the prior application is herewith incorporated by reference in its entirety.

BACKGROUND OF THE INVENTION

Field of the Invention

The present invention relates to the frequency hopping radio communication technology, especially to a synchronous access method in frequency hopping radio communication and a communication device such as a master device and a slave device, and a frequency hopping radio communication system containing a master device and a slave device.

Frequency hopping is a technology used for realizing reliable radio communication in an environment which shows frequency selective signal fading or unknown narrow-band interference from other devices. Besides being used in communication standards like Bluetooth and so on, the frequency hopping technology has also been used in many dedicated radio solutions, for example, for sending a wireless audio stream to a hearing aid.

In applications like Body Area Network, wireless sensor network, and so on, power consumption is an important design consideration factor. There are usually also requirements for low time delay (a wireless connection needs to be established rapidly), and simplification of computation complexity and memory consumption, especially for systems based on low cost components having limited processing capabilities.

In frequency hopping radio communication, a client connected to a frequency hopping radio communication system should be able to establish a data connection as rapidly as possible, and not spend too much time (and energy) scanning (monitoring) a channel or exchanging protocol information with a master device. As the first step of establishing connection, a slave device must be synchronized with the master device. Usually, the slave device needs to acquire general information containing synchronization information such as a frequency hopping sequence and so on from a beacon or a management packet broadcast by the master device. In principle, the master device can broadcast the general information quite frequently over a single channel or a (small) set of channels. For example, FIG. 1 shows a schematic diagram of a synchronous access method for frequency hopping radio communication of the prior art. In FIG. 1, the horizontal axis represents the time axis. The master device 10 adopts in total five different frequency hopping channels CH0, CH1, CH2, CH3, and CH4 with different frequencies, and performs channel frequency hopping in a frequency hopping time interval of T1 and a frequency hopping sequence of CH0, CH1, CH2, CH3, and CH4. CH0 and CH1 are used as signaling channels for sending broadcast beacons, and the other three channels CH2, CH3, and CH4 are used as data channels for sending payload data. In this case, the slave device can rapidly acquire the broadcast beacon by merely scanning signaling channels CH0 and CH1. Then, the slave device can learn the frequency hopping sequence (i.e. CH2, CH3, and CH4) for the payload data via the broadcast beacon and synchronize with it.

In the above-mentioned prior art, since an additional signaling channel is required, the bandwidth is still not efficiently used for data; and since the number of signaling channels is relatively small, there is still room to improve the anti-interference of the solution.

SUMMARY OF THE INVENTION

On that account, one purpose of the embodiments of the present invention is to provide a synchronous access method to further increase bandwidth utilization, and increase anti-interference. Another purpose of the embodiments of the present invention is to provide a corresponding communication device (a master device and a slave device) and a frequency hopping radio communication system.

According to a first aspect of the embodiments of the present invention, a method for performing synchronous access between a first communication device and a second communication device in frequency hopping radio communication is provided. The first communication device adopts N frequency hopping channels and performs frequency hopping in a predetermined frequency hopping sequence and at a predetermined frequency hopping time interval. The method includes: sending, by the first communication device, a broadcast beacon over the N frequency hopping channels with a cycle of M times the predetermined frequency hopping time interval. The broadcast beacon carries synchronization information for synchronous access of the second communication device, and wherein M and N are both natural numbers and are relatively prime, thus ensuring that the broadcast beacon is sent over all the N frequency hopping channels in turn periodically. The second communication device receiving the broadcast beacon over any one frequency hopping channel of the N frequency hopping channels to acquire the synchronization information. The second communication device exchanging information with the first communication device for access.

By virtue of the above-mentioned synchronous access method, synchronous access can be implemented flexibly and simply, efficient utilization and good anti-interference of a bandwidth can be achieved, and rapid and reliable synchronization performed with quite low power consumption is allowed, the need of the slave device to process the broadcast packet (beacon) and the payload packet is eliminated, and a very low complexity can be realized on the communication device side in terms of both memory and calculation capability.

In the above-mentioned first aspect of the present invention, preferably, the step of receiving, by the second communication device, the broadcast beacon over any one frequency hopping channel of the N frequency hopping channels to acquire the synchronization information includes: monitoring, by the second communication device, one frequency hopping channel of the N frequency hopping channels, and when a packet sent by the first communication device is received over the frequency hopping channel, establishing basic synchronization with the first communication device. When the packet is the broadcast beacon, receiving the broadcast beacon, when the packet is not the broadcast beacon, from the moment of receiving the packet, the second communication device monitors the monitored frequency hopping channel once every N predetermined time intervals until the broadcast beacon is received over the monitored frequency hopping channel.

Preferably, the second communication device is dormant before each monitoring.

By virtue of the above-mentioned preferred method, the second communication device (slave device) can operate with a low duty ratio in the early period of the synchronization stage, so as to realize low power consumption.

In the above-mentioned first aspect of the present invention, preferably, the step of exchanging information, by the second communication device, with the first communication device for access includes: sending, by the second communication device, feedback information to the first communication device. The first communication device allocating, according to the feedback information, to the second communication device at least one frequency hopping channel of the N frequency hopping channels as a dedicated channel dedicated for communication between the first communication device and the second communication device.

After access is provided, the first communication device communicates with the second communication device over the dedicated channel. The first communication device sends, over the dedicated channel, to the second communication device dedicated information dedicated for the second communication device while not sending the broadcast beacon.

By virtue of the above-mentioned preferred method, different dedicated channels can be allocated to different communication devices to avoid collision among different communication devices.

In the above-mentioned first aspect of the present invention, preferably, after having provided access, the second communication device only receives the dedicated information sent by the first communication device over the dedicated channel, and the broadcast beacon sent by the first communication device over the dedicated channel, and the second communication device does not provide feedback for the broadcast beacon.

By virtue of the above-mentioned preferred method, the power consumption can be further reduced.

In the above-mentioned first aspect of the present invention, preferably, when the channel quality of the dedicated channel deteriorates, resulting in incapability to support normal communication, the first communication device allocates to the second communication device another frequency hopping channel as a new dedicated channel.

By virtue of the above-mentioned preferred method, the solution is more flexible and the communication quality can be ensured.

In the above-mentioned first aspect of the present invention, preferably, the feedback information contains data rate requirements.

Preferably, the higher the required data rate, the more frequency hopping channels from the N frequency hopping channels are allocated by the first communication device to the second communication device as the dedicated channel.

By virtue of the above-mentioned preferred method, different data rates can be realized by allocating different numbers of dedicated channels according to the data rate requirements of different communication devices, thereby realizing flexibility.

In the above-mentioned first aspect of the present invention, preferably, the first communication device additionally sends the broadcast beacon over the frequency hopping channel which is not allocated as a dedicated channel while not sending the broadcast beacon.

By virtue of the above-mentioned preferred method, the synchronization time can be further reduced to realize more rapid synchronous access.

According to a second aspect of the present invention, a communication device (a master device) capable of performing synchronous access with another communication device in frequency hopping radio communication is provided. The communication device adopts N frequency hopping channels and performs frequency hopping in a predetermined frequency hopping sequence and at a predetermined frequency hopping time interval. The communication device contains a sending unit for sending a broadcast beacon over the N frequency hopping channels with a cycle of M times the predetermined frequency hopping time interval. The broadcast beacon carries synchronization information for synchronous access of the another communication device, and wherein M and N are both natural numbers and are relatively prime, thus ensuring that the broadcast beacon is sent over all the N frequency hopping channels in turn periodically.

By virtue of the above-mentioned communication device, synchronous access can be implemented flexibly and simply, efficient utilization and good anti-interference of a bandwidth can be achieved, and rapid and reliable synchronization performed with quite low power consumption is allowed, the need of the slave device to differently process the broadcast packet (beacon) and the payload packet is eliminated, and a very low complexity can be realized on the communication device side in terms of both memory and calculation capability.

In the above-mentioned second aspect of the present invention, preferably, the communication device further contains a receiving unit for receiving feedback information sent from the another communication device; and a dedicated channel allocation unit for allocating, according to the feedback information, to the another communication device at least one frequency hopping channel of the N frequency hopping channels as a dedicated channel dedicated for communication between the communication device and the another communication device.

After access is completed, the sending unit sends to another communication device dedicated information dedicated for the another communication device over the dedicated channel while not sending the broadcast beacon.

By virtue of the above-mentioned preferred method, different dedicated channels can be allocated to different communication devices to avoid collision among different communication devices.

In the above-mentioned second aspect of the present invention, preferably, when the channel quality of the dedicated channel deteriorates, resulting in incapability to support normal communication, the dedicated channel allocation unit allocates to the another communication device another frequency hopping channel as a new dedicated channel.

By virtue of the above-mentioned preferred method, the solution is more flexible and the communication quality can be ensured.

In the above-mentioned first aspect of the present invention, preferably, the sending unit additionally sends the broadcast beacon over the frequency hopping channel of the unallocated dedicated channels while not sending the broadcast beacon.

By virtue of the above-mentioned preferred method, the synchronization time can be further reduced to provide more rapid synchronous access.

According to a third aspect of the present invention, a communication device (a slave device) is provided for performing synchronous access with another communication device in frequency hopping radio communication. The communication device adopts N frequency hopping channels and performs frequency hopping in a predetermined frequency hopping sequence and at a predetermined frequency hopping time interval. The communication device contains a receiving unit for receiving the broadcast beacon over any one frequency hopping channel of the N frequency hopping channels adopted by the another communication device so as to acquire the synchronization information for synchronous access of the communication device. The another communication device sends the broadcast beacon over the N frequency hopping channels with a cycle of M times the predetermined frequency hopping time interval. The broadcast beacon carries general information general to any other communication devices, the general information includes the synchronization information. Wherein M and N are both natural numbers and are relatively prime, thus ensuring that the broadcast beacon is sent over all the N frequency hopping channels in turn periodically.

By virtue of the above-mentioned communication device, synchronous access can be implemented flexibly and simply, efficient utilization and good anti-interference of a bandwidth can be achieved, and rapid and reliable synchronization performed with quite low power consumption is allowed, the need of the slave device to differently process the broadcast packet (beacon) and the payload packet is eliminated, and a very low complexity can be realized on the communication device side in terms of both memory and calculation capability.

In the above-mentioned third aspect of the present invention, preferably, the communication device further contains a monitoring unit for monitoring one frequency hopping channel of the N frequency hopping channels; and a basic synchronization establishment unit. When the receiving unit receives a packet sent by the another communication device over the monitored frequency hopping channel, the basic synchronization establishment unit establishes basic synchronization with the another communication device. When the packet is the broadcast beacon, the receiving unit receives the broadcast beacon over the frequency hopping channel; and when the packet is not the broadcast beacon, from the moment of receiving the packet, the monitoring unit monitors the frequency hopping channel once every N of the predetermined time intervals until the receiving unit receives the broadcast beacon over the frequency hopping channel.

Preferably, the communication device is dormant before each monitoring.

By virtue of the above-mentioned preferred method, the second communication device (slave device) can operate with a low duty ratio in the early period of the synchronization stage, so as to realize low power consumption.

In the above-mentioned third aspect of the present invention, preferably, the communication device further has a sending unit for sending feedback information to the another communication device after the receiving unit receives the broadcast beacon.

By the above-mentioned preferred method, the possibility for any device to provide feedback is provided.

According to a fourth aspect of the present invention, provided is a frequency hopping radio communication system, containing a first communication device, being any one of the master devices mentioned above; and at least one second communication device, being any one of the slave devices mentioned above.

Particularly, provided is a frequency hopping radio communication system, containing a first communication device and at least one second communication device for synchronous access. The first communication device adopts N frequency hopping channels and performs frequency hopping in a predetermined frequency hopping sequence and at a predetermined frequency hopping time interval, and wherein the first communication device sends a broadcast beacon over the N frequency hopping channels with a cycle of M times the predetermined frequency hopping time interval. The broadcast beacon carries synchronization information for synchronous access of the second communication device, and wherein M and N are both natural numbers and are relatively prime, thus ensuring that the broadcast beacon is sent over all the N frequency hopping channels in turn periodically. The second communication device receives the broadcast beacon over any one frequency hopping channel of the N frequency hopping channels to acquire the synchronization information. The second communication device exchanges information with the first communication device for access.

By virtue of the above-mentioned frequency hopping radio communication system, synchronous access can be implemented flexibly and simply, efficient utilization and good anti-interference of a bandwidth can be achieved, and rapid and reliable synchronization performed with quite low power consumption is allowed, the need of the slave device to differently process the broadcast packet (beacon) and the payload packet is eliminated, and a very low complexity can be realized on the communication device side in terms of both memory and calculation capability.

In the above-mentioned fourth aspect of the present invention, preferably, the step of exchanging information, by the second communication device, with the first communication device for providing access includes: sending, by the second communication device, feedback information to the first communication device. The first communication device allocates, according to the feedback information, to the second communication device at least one frequency hopping channel of the N frequency hopping channels as a dedicated channel dedicated for communication between the first communication device and the second communication device. After access is provided, the first communication device communicates with the second communication device over the dedicated channel. The first communication device sends, over the dedicated channel, to the second communication device dedicated information dedicated for the second communication device while not sending the broadcast beacon.

By virtue of the above-mentioned preferred method, different dedicated channels can be allocated to different communication devices to avoid collision among different communication devices.

Other features which are considered as characteristic for the invention are set forth in the appended claims.

Although the invention is illustrated and described herein as embodied in a synchronous access method, and a communication device and a system in frequency radio communication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

In order to make the object, technical solutions and advantages of the present invention more apparent, the present invention will be further described in detail hereinbelow by way of embodiments.

As briefly described in the forgoing background art section, since the slave device does not know the frequency hopping sequence adopted by the master device, the slave device should first of all receive the broadcast beacon sent by the master device in order for performing synchronous access with the master device. The broadcast beacon carries general information general to all the slave devices in the radio communication system, including the master device address, the frequency hopping sequence, etc. After receiving the broadcast beacon, the slave device then can learn the frequency hopping sequence adopted by the master device and perform synchronization therewith.

Figure 1:
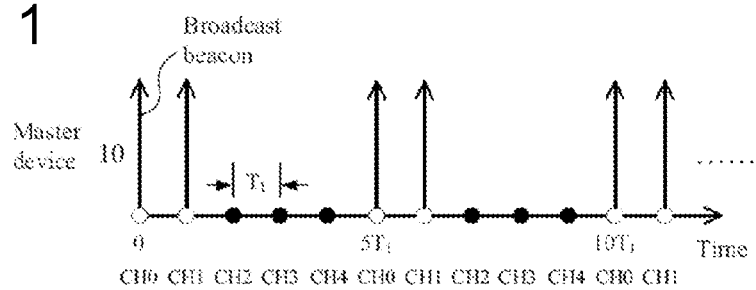
FIG. 1 is a schematic diagram of a synchronous access method for frequency hopping radio communication according to the prior art.

Different from the synchronous access method for frequency hopping radio communication of the prior art described in FIG. 1, in the synchronous access method for frequency hopping radio communication in the embodiments of the present invention, the master device does not specially adopt a single or a set of frequency hopping channel(s) as the signaling channel to send the broadcast beacon, but employs all the frequency hopping channels as both signaling channels and data channels.

Particularly, in the synchronous access method for frequency hopping radio communication in the embodiments of the present invention, the broadcast beacon is sent over all the frequency hopping channels in turn to achieve efficient utilization of the bandwidth and improve anti-interference. For example, it can be assumed that the master device adopts N frequency hopping channels and performs frequency hopping in a certain frequency hopping sequence and at a certain predetermined frequency hopping time interval. The master device sends the broadcast beacon over the N frequency hopping channels with a cycle of M times of the frequency hopping time interval, wherein M and N are natural numbers and are relatively prime. Herein, the key condition is that M and N are relatively prime, and as long as this condition is satisfied the broadcast beacon can be sent over all the N frequency hopping channels in turn periodically.

Figure 2:
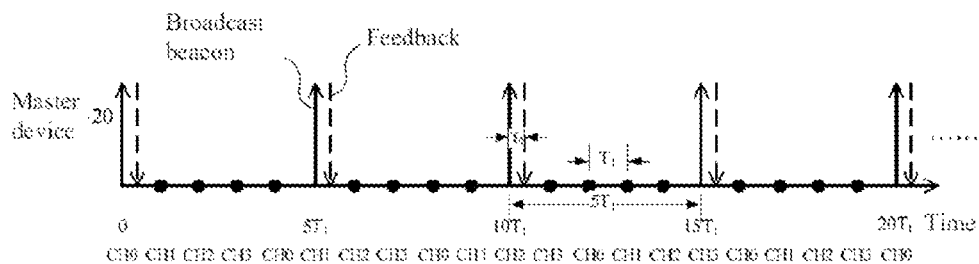
FIG. 2 is a schematic diagram of a synchronous access method for frequency hopping communication according to the invention.

To express the idea of the embodiments of the present invention more intuitively, FIG. 2 shows an example situation of M=N+1 when M and N are relatively prime. FIG. 2 shows a schematic diagram of a synchronous access method for frequency hopping radio communication according to one of the embodiments of the present invention. In FIG. 2, the horizontal axis represents the time axis. In this embodiment, as an example, the master device 20 adopts in total four (i.e. N=4) frequency hopping channels CH0, CH1, CH2, CH3 of different frequencies, and adopts a time interval T1 as the frequency hopping time interval and performs channel frequency hopping in a frequency hopping sequence of CH0, CH1, CH2, CH3, that is to say, performs a channel frequency hopping every time interval T1. Particularly, first adopting channel CH0 at the initial time 0, performing a first channel frequency hopping at time T1 to hop from channel CH0 to channel CH1, performing a second frequency hopping at time 2T1 to hop from channel CH1 to channel CH2, ... performing a fourth frequency hopping at time 4T1 to hop from channel CH3 to channel CH0, and so forth.

In the example shown in FIG. 2, the cycle of sending a broadcast beacon by the master device 20 is 5T1, that is to say the time interval between each two continuous broadcast beacons is 5T1, i.e. 5 times (i.e. M=5) the frequency hopping time interval T1 (in other words, the number of frequency hopping between each two continuous broadcast beacons is 5, or, there are 4 frequency hopping channels between each two continuous broadcast beacons, which have not sent a broadcast beacon). As shown in FIG. 2, by sending a broadcast beacon with such a cycle, the broadcast beacon can be sent over the four frequency hopping channels CH0, CH1, CH2, CH3 in turn, as shown by the upward solid arrow in the FIG. 2. In the situation of M=N+1 shown in FIG. 2, the broadcast beacon can be sent in the sequence of CH0, CH1, CH2, CH3, which is the same as the frequency hopping sequence adopted by the master device 20, on all the four frequency hopping channels in turn.

It should be noted that, the situation of M=N+1 shown in FIG. 2 is one of the situations where M and N are relatively prime, other situations where M and N are relatively prime can all realize sending a broadcast beacon in turn over all the frequency hopping channels. For example, taking still the situation of N=4 as an example, when M=3, 7, 9 . . . , that the broadcast beacon be sent in turn over all the frequency hopping channels can all be realized. For example, when M=3, the cycle of sending the broadcast beacon by the master device 20 is 3T1, i.e. sending, periodically, the broadcast beacon in such a sequence of CH0, CH3, CH2, CH1 and at a sending time interval of 3T1; when M=7, the cycle of sending the broadcast beacon by the master device 20 is 7T1, i.e. sending, periodically, the broadcast beacon in such a sequence of CH0, CH3, CH2, CH1 and at a sending time interval of 7T1; and when M=9, the cycle of sending the broadcast beacon by the master device 20 is 9T1, i.e. sending, periodically, the broadcast beacon in such a sequence of CH0, CH1, CH2, CH3 and at a sending time interval of 9T1, and so forth. It can be deduced from what is described above that, when M=nN+1 (n is a natural number), the broadcast beacon is sent in turn over all the frequency hopping channels in a sequence which is absolutely equal to the frequency hopping channel adopted by the master device.

The sending of the broadcast beacon is described in detail above. Herein below, the receiving of the broadcast beacon will be further described.

When the slave device tries to establish a communication link with the master device, it will first receive the broadcast beacon sent by the master device to acquire the frequency hopping sequence used by the master device and perform synchronization therewith. In the traditional synchronous access method as shown in FIG. 1, to enable the slave device to rapidly acquire the broadcast beacon by scanning only signaling channels CH0 and CH1 during a relative short time prior to receiving the broadcast beacon successfully, the premise is that the slave device should know in advance which frequency hopping channels are adopted by the master device 10 as signaling channels. However, this would need the settings of the signaling channel of the master device 10 to be stored in the memory of the slave device in advance, which would increase the complexity of the slave device side. Moreover, if the slave device does not store information about which frequency hopping channels are adopted by the master device 10 as signaling channels for the broadcast beacon in advance, then the slave device may need to scan (monitor) a plurality of channels before being able to receive the broadcast beacon when trying to establish a communication link with the master device 10. For example, the slave device might first try to scan (monitor) any one channel thereof, and if no broadcast beacon is received within a specific time, the slave device would then scan other channels instead until a broadcast beacon is received. In this way, if the slave device first monitors the frequency hopping channels CH2, CH3 and CH4 as data channels in FIG. 1, and monitors the frequency hopping channels CH0 and CH1 as signaling channels at last, then the synchronization time would be too long because of scanning a plurality of channels.

By virtue of the above-mentioned method of the embodiments of the invention, the broadcast beacon can be sent in turn over all the frequency hopping channels; therefore when the slave device tries to establish a communication link with the master device 20, only any one frequency hopping channel adopted by the master device 20 needs to be monitored, i.e. the broadcast beacon can be received sooner or later to acquire synchronization information, such as the frequency hopping channel adopted by the master device 20, for synchronization. Moreover, setting information about the signaling channel does not need to be pre-stored in the slave device; hence, the low complexity of the slave device can be realized whether in the aspect of memory or calculation capability.

It should be noted that, the slave device can first establish basic synchronization with the master device 20 once it receives the packet from the monitored frequency hopping channel. In the synchronous access method in the embodiments of the present invention, all the frequency channels are used to send both the broadcast beacon and the payload data, and so on. Therefore, even though the received packet is not a broadcast beacon but a dedicated packet for some other devices, the slave device can also know the time when the next packet may be received (i.e. the time slot after N frequency hopping time intervals T1), and can monitor the frequency hopping channel every N frequency hopping time intervals until a broadcast beacon is received over the frequency hopping channel. The slave device can remain dormant before each monitoring to save energy; hence, the slave device can operate with a low duty ratio from the early period of the synchronization stage.

When the slave device receives the broadcast beacon sent by the master device and acquires synchronization information, the slave device will exchange information with the master device for performing an access process, so as to finally establish a communication link. The access process of information exchange can be realized by adopting one or more handshakes. The access process is briefly described by taking a handshake shown in FIG. 2 for example in the embodiments of the present invention, but the embodiments of the present invention are not limited to this. As shown in FIG. 2, the time slot after time T0 each time labeled since the broadcast beacon is sent is called a feedback time slot (i.e. the time slot corresponding to the downward dotted arrow following each upward solid arrow in FIG. 2), the feedback time slot is also preset during the system design and is known to the master device and the slave device. In this feedback time slot, the master device 20 tries to receive feedback (such as a resource request) from other devices over the same channel as that for sending the broadcast beacon this time (as shown by the downward dotted arrow in FIG. 2). Any slave device trying to establish a communication link with the master device 20 can send feedback information to the master device 20 in the feedback time slot after receiving the broadcast beacon sent by the master device this time, the feedback information can contain for example the slave device address, data rate requirements, channel quality, etc. This mechanism provides the possibility for any slave device to provide feedback.

Figure 3:
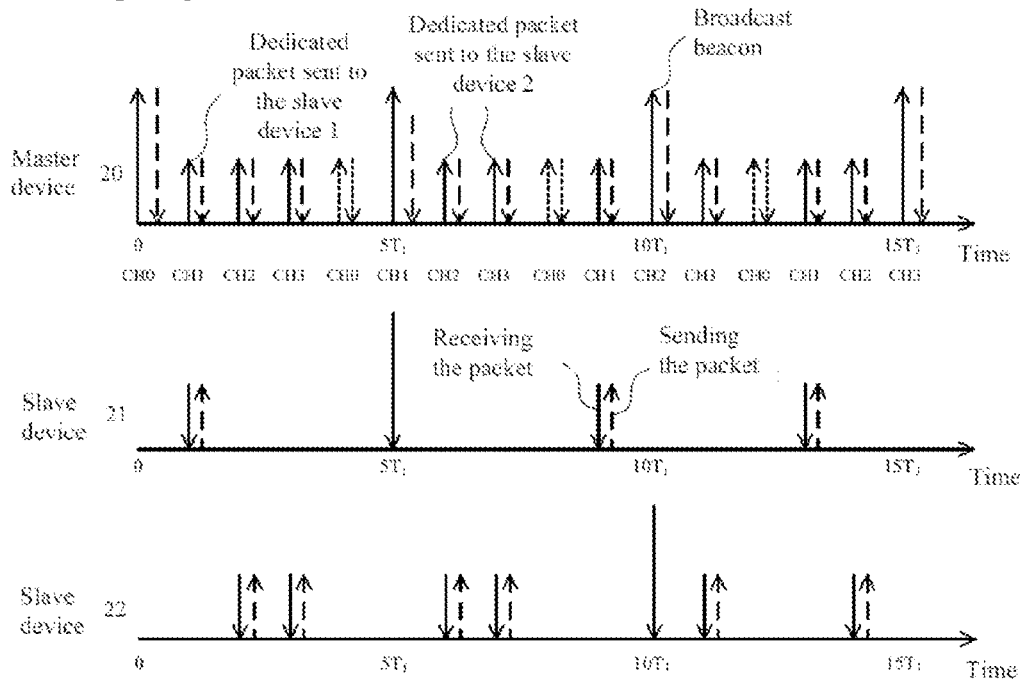
FIG. 3 is a schematic diagram of a synchronous access method for frequency hopping radio communication according to the invention.

The master device can allocate, based on the data rate requirements (and the channel quality) after receiving the feedback information sent by the slave device, one or more frequency hopping channels to the slave device as dedicated channels dedicated for communication between the master device and the slave device. FIG. 3 shows another schematic diagram of a synchronous access method for frequency hopping radio communication according to the embodiments of the present invention. FIG. 3 is a further supplementary description for the situation in FIG. 2.

In FIG. 3, the upside corresponds to the situations of frequency hopping and packet transceiving of the master device 20 represented on the time axis in FIG. 2, the middle and the downside briefly represent the packet transceiving situations respectively of two slave devices 21 and 22 corresponding to the master device 20 on the time axis. Referring to the master device 20 first, there are (M−1) frequency hopping channels between each two continuous broadcast beacons, the (M−1) frequency hopping channels are not used to send broadcast beacons, and thus can be used as dedicated channels. The master device 20 can send dedicated (payload) packets over the (M−1) dedicated channels, the time slots corresponding thereto can be called dedicated time slots. Different from the broadcast beacons, the dedicated packets are used for carrying specific information about the slave devices corresponding to the dedicated channels. In particular, as shown in FIG. 3, there are four frequency hopping channels CH1, CH2, CH3 and CH0 between sending the first broadcast beacon (initial time 0, over CH0) and sending the second broadcast beacon (time 5T1, over CH1), which can be used as dedicated channels. The master device 20 can allocate CH1 to the slave device 21 according to the feedback information (such as data rate requirements) of the slave device 21. Hence, the master device 20 and the slave device 21 can communicate over the frequency hopping channel CH1. As in FIG. 3, the upward solid arrow shorter than the broadcast beacon is used to represent the dedicated packets sent by the master device 20. For example, the short solid arrows corresponding to the frequency hopping channel CH1 and the dedicated time slots thereof represent the dedicated packets sent by the master device 20 to the slave device 21, and the upward short dotted arrows following the solid arrows represent the packets received by the master device 20 and sent by the slave device 21; for the slave device 21, the downward short solid arrows corresponding to the frequency hopping channel CH1 and the dedicated time slots thereof represent the received dedicated packets sent by the master device 20, and the upward short dotted arrows following the solid arrows represent the packets received sent by the slave device 20 to the master device 21.

It should be noted herein that, since in the synchronous access method of the embodiments of the present invention, all the frequency hopping channels are used as both signaling channels and data channels, when the master device 20 sends broadcast beacons over the frequency hopping channel CH1, the slave device 21 does not send any information to the master device 20 in the subsequent feedback time slot, so as to leave the feedback time slot to other slave devices which try to establish communication links with the master device 20 for performing an access process. For example, as shown in FIG. 3, for the slave device 21, the downward long solid arrows corresponding to the frequency hopping channel CH1 and the dedicated time slots thereof represent the received broadcast beacons sent from the master device 20, and during the subsequent feedback time slot the slave device 21 does not send any packet.

In the same way, the master device 20 can allocate CH2 and CH3 to the slave device 22 according to the feedback information sent by the slave device 22 (for example, the data rate requirement is twice that of the slave device 21). Hence, the master device 20 and the slave device 22 can communicate over the frequency hopping channels CH2 and CH3. The communication between the master device 20 and the slave device 22 are similar to the communication between the master device 20 and the slave device 21, which will not be described here.

By allocating the dedicated frequency hopping channels to each slave device, different slave devices can have different dedicated channels and each slave device only responds to the dedicated packet of its own, so that no collision would happen among different slave devices.

Since the slave device can be left over the dedicated frequency hopping channel allocated to the slave device only to communicate with the master device, and does not need to perform frequency hopping in accordance with all the channels of the master device, the slave device can be dormant in a very regular manner and realize a very low duty ratio. For example, as for the slave device 21 in FIG. 3, it is possible to monitor the frequency hopping channel CH1 only, and remain dormant in other time slots corresponding to other frequency hopping channels. Moreover, the slave device can receive not only the dedicated packet of the slave device but also the broadcast beacon sent by the master device over the dedicated frequency hopping channels allocated to the slave device, to acquire the management information about the master device. Apparently, links of different data rates between the master device and the slave device can be realized easily and flexibly by allocating different numbers of dedicated channels to the slave devices. For example, as shown in FIG. 3, the slave device 21 and the slave device 22 have 1 or 2 channels respectively, and accordingly, the data rate of the slave device 22 is twice that of the slave device 21.

Moreover, by virtue of the synchronous access method of the embodiments of the present invention, if the quality of the dedicated channel of the slave device deteriorates so much that it is unable to support normal communication, then the master device can easily allocate a new channel to the slave device. For example, as shown in FIG. 3, if the quality of the dedicated frequency hopping channel CH1 allocated to the slave device 21 by the master device 20 deteriorates, then the master device 20 can consider reallocating the channel CH0, which is not allocated as a dedicated channel, to the slave device 21.

It should be noted that, the master device can also additionally send broadcast beacons over the dedicated time slots which have not been allocated to any slave devices. For example, the short dotted arrow corresponding to CH0 in FIG. 3 represents that: the frequency hopping channel CH0 (and the corresponding dedicated time slot), between two continuous broadcast beacons, which can be used as a dedicated channel is not allocated to the slave devices 21 and 22. Hence, the master device 20 can additionally send broadcast beacons over the frequency hopping channel CH0 (and the corresponding dedicated time slot). In this way, the synchronization time is further shortened.

It should be noted that, although the above-mentioned description is based on the master device and the slave device, any communication devices participating in the frequency hopping radio communication can act as the master device or the slave device.

Figure 4:
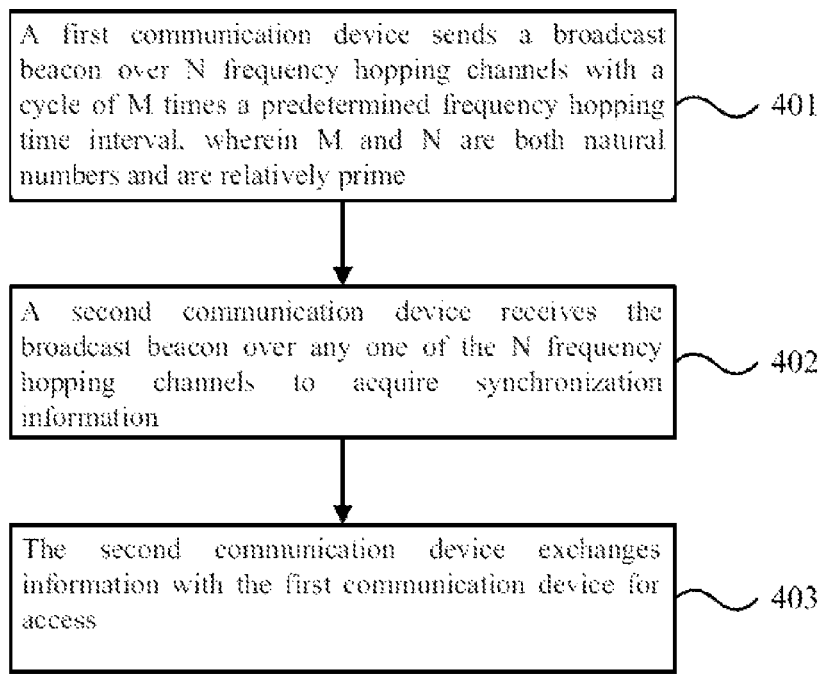
FIG. 4 is a flow chart of a synchronous access method for frequency hopping radio communication according to the invention.

FIG. 4 shows a flow chart of a synchronous access method 40 for frequency hopping radio communication according to an embodiment of the embodiments of the present invention.

As shown in FIG. 4, a method for performing synchronous access between a first communication device and a second communication device in frequency hopping radio communication is provided, wherein the first communication device adopts N frequency hopping channels and performs frequency hopping in a predetermined frequency hopping sequence and at a predetermined frequency hopping time interval. In step 401, the first communication device sends broadcast beacons over N frequency hopping channels with a cycle of M times the predetermined frequency hopping time interval. The broadcast beacons carry general information general to any other communication devices, the general information containing synchronization information for the synchronous access of the second communication device. Moreover, M and N are natural numbers and are relatively prime, thus ensuring that the broadcast beacons are sent periodically over all the N frequency hopping channels in turn. In step 402, the second communication device receives the broadcast beacons over any one of the N frequency hopping channels to acquire the synchronization information. In step 403, the second communication device exchanges information with the first communication device for access.

In the above-mentioned method shown in FIG. 4, the first communication device and the second communication device can respectively correspond to the aforementioned master device and slave device.

The method 40 shown in FIG. 4 is flexible, simple and easy to implement, which can realize efficient utilization and good anti-interference of the bandwidth, allows synchronization to be performed rapidly and reliably with quite low power consumption, eliminates the need of the slave device to differently process the broadcast packet (beacon) and the payload packet, and realizes a very low complexity on the communication device side in terms of both memory and calculation capability.

Figure 5:
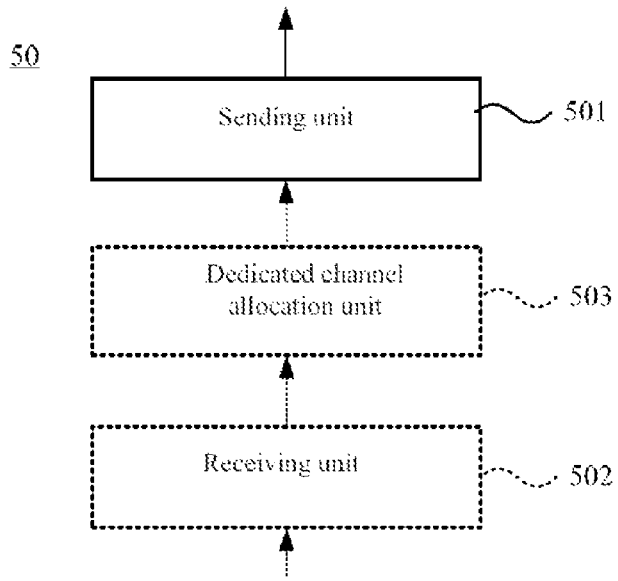
FIG. 5 is a structural block diagram of a communication device for synchronous access in frequency hopping radio communication according to the invention.

FIG. 5 shows a structural block diagram of a communication device 50 for synchronous access in frequency hopping radio communication according to the embodiments of the present invention.

As shown in FIG. 5, the communication device 50 is used to perform synchronous access with another communication device in frequency hopping radio communication. The communication device 50 adopts N frequency hopping channels and performs frequency hopping in a predetermined frequency hopping sequence and at a predetermined frequency hopping time interval. The communication device 50 contains a sending unit 501 for sending broadcast beacons over N frequency hopping channels with a cycle of M times of the predetermined frequency hopping time interval. The broadcast beacons carry general information general to any other communication devices, the general information containing synchronization information for the synchronous access of another communication device. M and N are natural numbers and are relatively prime, thus ensuring that the broadcast beacons are sent periodically over all the N frequency hopping channels in turn.

The communication device 50 shown in FIG. 5 can correspond to the aforementioned master device.

By virtue of the settings of the communication device 50 shown in FIG. 5, synchronous access that is flexible, simple and easy to implement can be achieved, efficient utilization and good anti-interference of a bandwidth can be achieved, and rapid and reliable synchronization performed with quite low power consumption is allowed, the need of the slave device to differently process the broadcast packet (beacon) and the payload packet is eliminated, and a very low complexity can be realized on the communication device side in terms of both memory and calculation capability.

The communication device 50 can further contain a receiving unit 502 and a dedicated channel allocation unit 503, as shown by the dotted box in FIG. 5. The receiving unit 502 is used to receive feedback information sent from another communication device. A dedicated channel allocation unit 503 allocates, according to the feedback information, to another communication device at least one frequency hopping channel of the N frequency hopping channels as a dedicated channel dedicated for communication between the communication device and the other communication device. Moreover, after the access is completed, the sending unit 501 sends to the other communication device dedicated information dedicated for the other communication device over the dedicated channel while not sending the broadcast beacon.

Hence, collision among different communication devices can be avoided by allocating different dedicated channels and time slots for different accessed communication devices.

Figure 6:
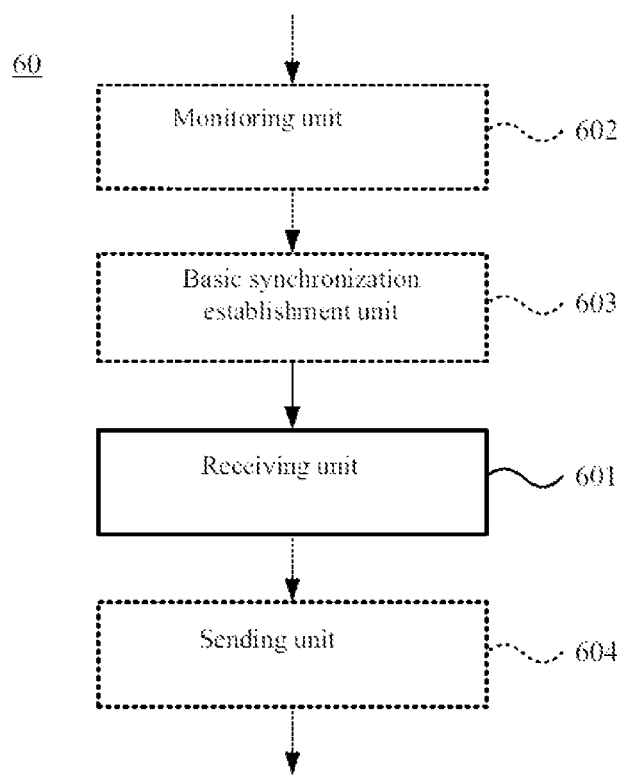
FIG. 6 is a structural block diagram of a communication device for synchronous access in frequency hopping radio communication according to the invention.

FIG. 6 shows a structural block diagram of a communication device 60 for synchronous access in frequency hopping radio communication according to an embodiment of the embodiments of the present invention.

As shown in FIG. 6, the communication device 60 is used to perform synchronous access with another communication device in frequency hopping radio communication. The other communication device adopts N frequency hopping channels and performs frequency hopping in a predetermined frequency hopping sequence and at a predetermined frequency hopping time interval. The communication device 60 contains a receiving unit 601, for receiving the broadcast beacon over any one frequency hopping channel of the N frequency hopping channels to acquire the synchronization information for synchronous access of the communication device 60. The other communication device sends the broadcast beacon over the N frequency hopping channels with a cycle of M times the predetermined frequency hopping time interval, wherein the broadcast beacon carries general information general to any other communication devices, the general information contains the synchronization information, and wherein M and N are both natural numbers and are relatively prime, thus ensuring that the broadcast beacon is sent over all the N frequency hopping channels in turn periodically.

The communication device 60 shown in FIG. 6 can correspond to the aforementioned slave device.

By virtue of the settings of the communication device 60 shown in FIG. 6, the synchronous access that is flexible, simple and easy to implement can be achieved, efficient utilization and good anti-interference of a bandwidth can be achieved, and rapid and reliable synchronization performed with quite low power consumption is allowed, the need of the slave device to differently process the broadcast packet (beacon) and the payload packet is eliminated, and a very low complexity can be realized on the communication device side in terms of both memory and calculation capability.

The communication device 60 can further contain a monitoring unit 602 and a basic synchronization establishment unit 603, as shown by the dotted box in FIG. 6. The monitoring unit 602 is used for monitoring a frequency hopping channel of the N frequency hopping channels. The basic synchronization establishment unit 603 is used for, when the receiving unit 601 receives a packet sent by the another communication device over that frequency hopping channel, establishing basic synchronization with the other communication device. Moreover, when the packet is not the broadcast beacon, since the moment the packet is received, the monitoring unit 602 monitors the frequency hopping channel every N the predetermined frequency hopping time interval, until the receiving unit 601 receives the broadcast beacon over the monitored frequency hopping channels. The communication device 60 can remain dormant before each monitoring. Hence, the communication device which is about to perform synchronous access can start to operate with a low duty ratio in the early period of the synchronization stage, thus reducing energy consumption.

The communication device 60 can further contain a sending unit 604 (shown in a dotted box in FIG. 6) for sending feedback information to another communication device after the receiving unit 601 receives a broadcast beacon. Therefore, the possibility for any slave device to provide feedback is provided.

The communication device 50 shown in FIG. 5 and the communication device 60 shown in FIG. 6 can perform the method shown in FIG. 4 as a first communication device and a second communication device respectively. The frequency hopping radio communication system can contain the communication device 50 shown in FIG. 5 and a plurality of communication devices 60 shown in FIG. 6, and the method shown in FIG. 4 can be performed between the communication device 50 and each of the communication devices 60.

It should be noted that, each unit contained in the communication devices 50 and 60 in FIGS. 5 and 6 can realize corresponding functions as separated units, and can also realize corresponding functions in combination with each other. Each unit is not limited to the functions described in the embodiment of the present invention. For example, in the communication device 50, the sending unit 501 can send not only broadcast beacons but also dedicated information, and so on, and the receiving unit 502 can receive not only the feedback information but also the dedicated packets sent by the slave device, and so on. In the same way, in the communication device 60, the sending unit 604 can send not only the feedback information but also dedicated packets, and so on, and the receiving unit 601 can receive not only the broadcast beacons but also the dedicated information, and so on. Each unit can be realized in the form of software, hardware, firmware or any combination thereof. In addition, the communication devices 50 and 60 can further contain other units, such as a memory, a processor, and so on.

According to another aspect of the embodiments of the present invention, a frequency hopping communication system is also provided, the system contains a first communication device as the master device and at least one second communication device as the slave device, wherein the first communication device is a communication device 20 or 50 described above, and the second communication device is a communication device 21, 22 or 60 described above.

By virtue of the above-mentioned flexible, simple and easy-to-implement synchronous access solution in frequency hopping radio communication provided in the embodiments of the present invention, efficient utilization and good anti-interference of a bandwidth can be achieved, and rapid and reliable synchronization performed with quite low power consumption is allowed, the need of the slave device to differently process the broadcast packet (beacon) and the payload packet is eliminated, and a very low complexity can be realized on the master device side and the slave device side in terms of both memory and calculation capability.

A method for performing synchronous access between a first communication device and a second communication device in frequency hopping radio communication, and a relevant communication device and system are provided in the embodiments of the present invention, wherein the first communication device adopts N frequency hopping channels and performs frequency hopping in a predetermined frequency hopping sequence and at a predetermined frequency hopping time interval. The method includes: sending, by the first communication device, a broadcast beacon over the N frequency hopping channels with a cycle of M times the predetermined frequency hopping time interval. The broadcast beacon carries general information containing synchronization information, and wherein M and N are both natural numbers and are relatively prime. The second communication device receives the broadcast beacon over any one frequency hopping channel of the N frequency hopping channels to acquire the synchronization information. The second communication device exchanges information with the first communication device for access. The above-mentioned flexible, simple and easy-to-implement synchronous access solution can achieve efficient utilization and good anti-interference of a bandwidth, and allows rapid and reliable synchronization to be performed with quite low power consumption.

What are described above are merely preferred embodiments of the present invention, and are not to limit the present invention, and any modifications, equivalent substitutions and improvements within the spirit and principle of the present invention should be covered by the protection scope of the present invention.

The invention claimed is:

1. A method for performing synchronous access between a first communication device and a second communication device in frequency hopping radio communication, which comprises the steps of:
configuring the first communication device to adopt N frequency hopping channels and perform frequency hopping in a predetermined frequency hopping sequence and at a predetermined frequency hopping time interval;
sending, via the first communication device, a broadcast beacon over the N frequency hopping channels with a cycle of M times the predetermined frequency hopping time interval, wherein the broadcast beacon carrying synchronization information for synchronous access of the second communication device, and M and N are both natural numbers and are relatively prime;
receiving, via the second communication device, the broadcast beacon over any one frequency hopping channel of the N frequency hopping channels to acquire the synchronization information, the receiving step further comprises the steps of:
monitoring, via the second communication device, one of the frequency hopping channels of the N frequency hopping channels, and when a packet sent by the first communication device being received over the one frequency hopping channel, establishing basic synchronization with the first communication device; and
receiving the broadcast beacon when the packet is the broadcast beacon, and when the packet is not the broadcast beacon, from a moment of receiving the packet, the second communication device monitors the one frequency hopping channel once every N of the predetermined frequency hopping time intervals until the broadcast beacon is received over the one frequency hopping channel, the second communication device is dormant before each monitoring; and
exchanging further information, via the second communication device, with the first communication device for access.

2. The synchronous access method according to claim 1, wherein the step of exchanging information, by the second communication device, with the first communication device for access, further comprises:
sending, via the second communication device, feedback information to the first communication device; and
allocating, via the first communication device, to the second communication device, according to the feedback information, at least one frequency hopping channel of the N frequency hopping channels as a dedicated channel dedicated for communication between the first communication device and the second communication device.

3. The synchronous access method according to claim 2, wherein after having completed the access, the second communication device only receives dedicated information sent by the first communication device over the dedicated channel and the broadcast beacon sent by the first communication device over the dedicated channel.

4. The synchronous access method according to claim 2, wherein the feedback information contains a data rate requirement.

5. The synchronous access method according to claim 3, which further comprises sending, via the first communication device, while not sending the broadcast beacon over the dedicated channel, the broadcast beacon over a frequency hopping channel which is not allocated as the dedicated channel.

6. The synchronous access method according to claim 3, wherein after having completed the access the second communication device does not provide feedback for the broadcast beacon.

7. The synchronous access method according to claim 2, wherein the feedback information contains a data rate requirement, and a higher a required data rate, the more frequency hopping channels from the N frequency hopping channels are allocated by the first communication device to the second communication device as the dedicated channel.

8. A first communication device capable of performing synchronous access with a second communication device via frequency hopping radio communication, the first communication device adopting N frequency hopping channels and performing frequency hopping in a predetermined frequency hopping sequence and at a predetermined frequency hopping time interval, the first communication device comprising:
a sending unit for sending a broadcast beacon over the N frequency hopping channels with a cycle of M times the predetermined frequency hopping time interval, the broadcast beacon carrying synchronization information for the synchronous access of the second communication device, and wherein M and N are both natural numbers and are relatively prime;
a receiving unit for receiving feedback information sent from the second communication device; and
a dedicated channel allocation unit for allocating to the second communication device, according to the feedback information, at least one frequency hopping channel of the N frequency hopping channels as a dedicated channel dedicated for communication between the first communication device and the second communication device.

9. The first communication device according to claim 8, wherein when a channel quality of the dedicated channel deteriorates, said dedicated channel allocation unit allocates another frequency hopping channel to the second communication device as a new dedicated channel.

10. The first communication device according to claim 8, wherein said sending unit additionally sends, while not sending the broadcast beacon over the dedicated channel, the broadcast beacon over a frequency hopping channel which is not allocated as the dedicated channel.

11. A first communication device, capable of synchronous access with a second communication device in frequency hopping radio communication, the first communication device comprising:
- a receiving unit for receiving a broadcast beacon over any one frequency hopping channel of the N frequency hopping channels adopted by the second communication device so as to acquire synchronization information for the synchronous access of the first communication device,
- a monitoring unit for monitoring one frequency hopping channel of the N frequency hopping channels; and
- a basic synchronization establishment unit, wherein when said receiving unit receives a packet sent by the second communication device over a monitored frequency hopping channel, said basic synchronization establishment unit establishes basic synchronization with the second communication device, and when a packet is the broadcast beacon, said receiving unit receives the broadcast beacon over the frequency hopping channel, and when the packet is not the broadcast beacon, from a moment of receiving the packet, said monitoring unit monitors the frequency hopping channel once every N of the predetermined time intervals until said receiving unit receives the broadcast beacon over the frequency hopping channel, wherein the first communication device is dormant before each monitoring.

12. The first communication device according to claim 11, further comprising:
- a sending unit for sending feedback information to the second communication device after said receiving unit receives the broadcast beacon.

* * * * *